US010592654B2

(12) United States Patent
Feifei et al.

(10) Patent No.: US 10,592,654 B2
(45) Date of Patent: Mar. 17, 2020

(54) ACCESS CONTROL TO COMPUTER RESOURCE

(71) Applicant: INTERNATIONAL BUSINESS MACHINES CORPORATION, Armonk, NY (US)

(72) Inventors: Xu Feifei, Shanghai (CN); Zhuang Liang, Shanghai (CN); Xin Hui CP Pan, Shanghai (CN); Yu Wenzhi, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 15/710,910

(22) Filed: Sep. 21, 2017

(65) Prior Publication Data

US 2019/0087563 A1 Mar. 21, 2019

(51) Int. Cl.
*H04L 29/06* (2006.01)
*G06F 21/36* (2013.01)
*G06F 21/31* (2013.01)

(52) U.S. Cl.
CPC ............ *G06F 21/36* (2013.01); *G06F 21/316* (2013.01); *G06F 2221/2133* (2013.01)

(58) Field of Classification Search
CPC .. G06F 21/31; G06F 21/36; G06F 2221/2103; G06F 2221/2133; G06F 21/316
See application file for complete search history.

(56) References Cited

U.S. PATENT DOCUMENTS

| 8,019,127 | B2 | 9/2011 | Misra | |
| 8,510,795 | B1* | 8/2013 | Gargi | G09B 5/06 |
| | | | | 382/276 |
| 8,868,423 | B2 | 10/2014 | Gross et al. | |
| 8,925,057 | B1* | 12/2014 | Ansari | G06F 21/31 |
| | | | | 382/181 |
| 9,075,983 | B2 | 7/2015 | Foote | |
| 9,495,532 | B1* | 11/2016 | Zhurkin | G06F 21/36 |
| 10,127,376 | B1* | 11/2018 | Robinson | G06F 21/36 |
| 2008/0066014 | A1* | 3/2008 | Misra | G06F 21/36 |
| | | | | 715/846 |

(Continued)

FOREIGN PATENT DOCUMENTS

| CN | 101178813 A | 5/2008 |
| CN | 102710635 A | 10/2012 |
| CN | 103106361 A | 5/2013 |

OTHER PUBLICATIONS

Elie Bursztein et al., A Gesture-based CAPTCHA Design Supporting Mobile Devices, Jul. 13-17, 2015, ACM, pp. 202-207.*

(Continued)

*Primary Examiner* — Karl L Schmidt
*Assistant Examiner* — Fahimeh Mohammadi
(74) *Attorney, Agent, or Firm* — Tihon Poltavets, Esq.; Kevin P. Radigan, Esq.; Heslin Rothenberg Farley & Mesiti P.C.

(57) ABSTRACT

Determining a group of figures for use in a vision test to distinguish computers from humans. An image is obtained and segmented into a plurality of parts. Based on the plurality of parts, a group of figures is determined to enable the group of figures to be displayed at a certain rate for a user to recognize the image.

13 Claims, 4 Drawing Sheets

(56) References Cited

U.S. PATENT DOCUMENTS

| | | | | |
|---|---|---|---|---|
| 2010/0077210 A1* | 3/2010 | Broder | ............... | G06F 21/46 713/168 |
| 2011/0208716 A1* | 8/2011 | Liu | ............... | G06F 21/36 707/710 |
| 2013/0347090 A1* | 12/2013 | Foote | ............... | G06F 21/31 726/7 |
| 2014/0181936 A1* | 6/2014 | Picard | ............... | H04L 63/08 726/7 |
| 2016/0036821 A1* | 2/2016 | Vandemar | ............... | H04L 63/102 726/4 |
| 2016/0239656 A1* | 8/2016 | Yan | ............... | G06F 21/36 |
| 2017/0061114 A1* | 3/2017 | Kalra | ............... | G06F 21/6218 |
| 2017/0161477 A1 | 6/2017 | Liu et al. | | |
| 2018/0189471 A1 | 7/2018 | Paluri | | |

OTHER PUBLICATIONS

Jeff Yan et al., A Low-cost Attack on a Microsoft CAPTCHA, Oct. 27-31, 2008, ACM, pp. 543-554.*

Ritendra Datta et al., Exploiting the Human-Machine Gap in Image Recognition for Designing CAPTCHAs, Sep. 2009, IEEE, vol. 4, Issue: 3, pp. 504-518.*

Haichang Gao et al., A Novel Image Based CAPTCHA Using Jigsaw Puzzle, Jan. 17, 2011, IEEE, pp. 351-356.*

Elie Bursztein et al., A Gesture-based CAPTCHA Design Supporting Mobile Devices, Jul. 13-17, 2015, ACM, pp. 202-207. (Year: 2015).*

Jeff Yan et al., A Low-cost Attack on a Microsoft CAPTCHA, Oct. 27-31, 2008, ACM, pp. 543-554. (Year: 2008).*

Ritendra Datta et al., Exploiting the Human—Machine Gap in Image Recognition for Designing CAPTCHAs, Sep. 2009, IEEE, vol. 4, Issue: 3, Page(s): 504-518. (Year: 2009).*

Haichang Gao et al., A Novel Image Based CAPTCHA Using Jigsaw Puzzle, Jan. 17, 2011, IEEE, pp. 351-356. (Year: 2011).*

Feifei et al, "Vision Test to Distinguish Computers From Humans", U.S. Appl. No. 15/805,799, filed Nov. 7, 2017 (23 pages).

List of IBM Patents or Patent Applications Treated as Related, Jan. 12, 2018, pp. 1-2.

Men, Tao et al., "A Dynamic CAPTCHA Based on Persistence of Vision," 2012 International Conference on Computer Science and Electronics Engineering, Jun. 2012, pp. 676-679.

INCE, Ibrahim Furkan et al., "Designing CAPTCHA Algorithm: Splitting and Rotating the Images Against OCRs," Third 2008 International Conference on Convergence and Hybrid Information Technology, Jul. 2008, pp. 596-601.

* cited by examiner

ACCESS CONTROL TO COMPUTER RESOURCE

BACKGROUND

One or more aspects of the present invention generally relate to the field of artificial intelligence and computer security, and more specifically, to a vision based test to distinguish computers from humans.

The term "CAPTCHA" is an acronym for "Completely Automated Public Turing Test to Tell Computers and Humans Apart". A CAPTCHA could be implemented by a program that protects websites against bots by generating and grading tests that humans can pass but current computer programs cannot.

CAPTCHAs are wildly used on the internet to tell computers and humans apart. However, with technologies like pattern recognition and artificial intelligence, computers also have the capability to recognize some simple CAPTCHA. To avoid being recognized by computers, some CAPTCHA are becoming more and more complex and fuzzy. This leads to a side effect, namely, sometimes even humans find it quite difficult to recognize the CAPTCHA. Further, even though some CAPTCHA are more complex and fuzzy, some computers can still recognize them.

SUMMARY

Example embodiments of the present disclosure provide a method, a system, and a computer program product for determining a group of figures for use in a vision test to distinguish computers from humans.

In an aspect, a computer-implemented method is provided. The method comprises obtaining, by an electronic device, an image. The image is segmented into a plurality of parts. A group of figures based on the plurality of parts is determined to enable the group of figures to be displayed at a certain rate for a user to recognize the image.

Other embodiments and aspects, including but not limited to, computer systems and computer program products, are described in detail herein and are considered a part of the claimed invention.

It is to be understood that the Summary is not intended to identify key or essential features of embodiments of the present disclosure, nor is it intended to be used to limit the scope of aspects of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 shows a diagram of M figures segmented from the original image in accordance with embodiments of the present disclosure.

DETAILED DESCRIPTION

Various embodiments are described in more detail with reference to the accompanying drawings, in which embodiments of the present disclosure have been illustrated. However, aspects of the present disclosure can be implemented in various manners, and thus, should not be construed to be limited to the embodiments disclosed herein.

Figure 1:
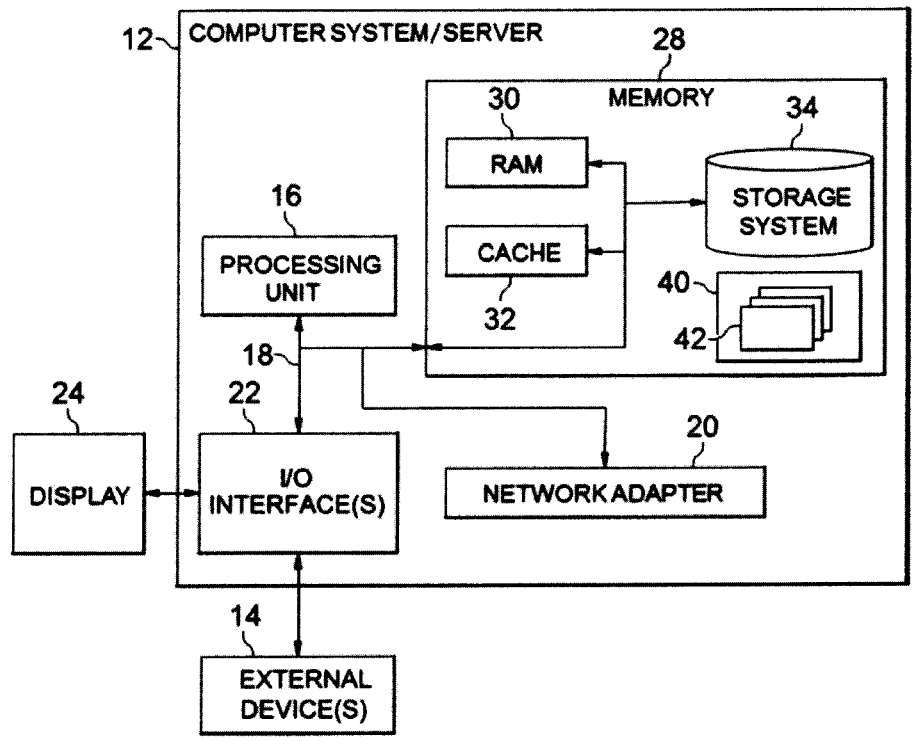
FIG. 1 shows an example computer system which is applicable to implement the embodiments of the present disclosure.

Referring now to FIG. 1, in which an example computer system/server 12 which is applicable to implement embodiments of the present invention is shown. FIG. 1 is also adapted to depict an illustrative example of a portable electronic device, such as a communication device which is applicable to implement embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One of the ways websites often defend against bots and the like is by using pseudo-Turing tests. They present some kind of test intended to separate the spam scripts from the humans—what some would call a "reverse Turing test" because it involves a computer testing a human, rather than a human testing a computer. By far, the most common type of such a test on the Web is a challenge-response test called a CAPTCHA. The way the common CAPTCHA works is by presenting the user with a string of letters (and sometimes numbers or even other symbols), turned into a distorted image to defeat character recognition software. The humans visiting the site are presumably capable of recognizing letters even when distorted visually, so such humans can type the letters from the image into a form field and submit them. Spammer scripts, on the other hand, should fail.

With rapid development of OCR (Optical Character Recognition) technology, some CAPTCHA can be easily identified by OCR programs; therefore, some CAPTCHA are designed more and more complex with very serious image distortion, which in the end makes it very difficult to be recognized by humans. Striking the right balance between "too easy" and "too hard" can be difficult.

To solve this problem, an embodiment of this disclosure proposes a new technique to present segmentations of a CAPTCHA image at a certain rate to keep a human's persistence of vision to the original images so that a human can still "see" the whole image as a static image. Computers, however, can recognize the image by only one or several screenshots of the CAPTCHA because each screenshot of the CAPTCHA would be only a small part of the image. Thus, even if computers capture all slices of the CAPTCHA, they still cannot recover the original image.

Figure 2:
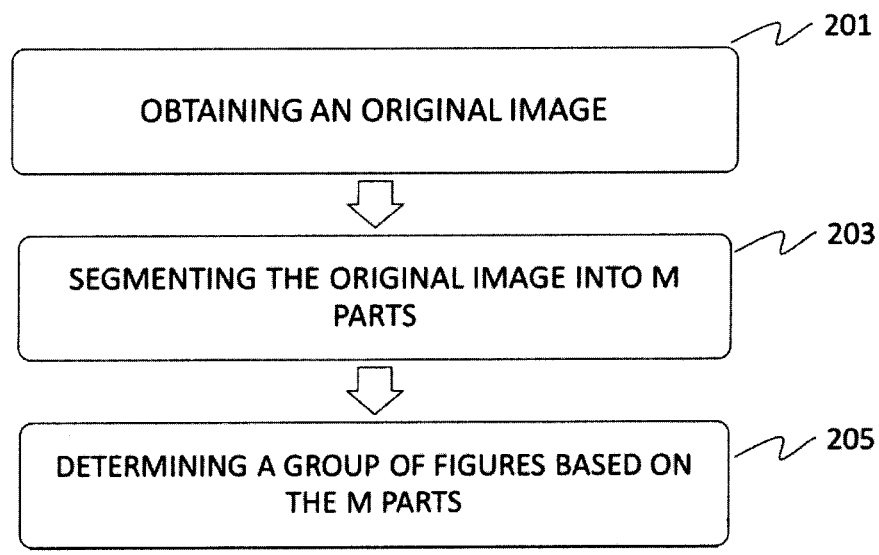
FIG. 2 shows an example flowchart indicating process steps in accordance with embodiments of the present disclosure.
Figure 3:
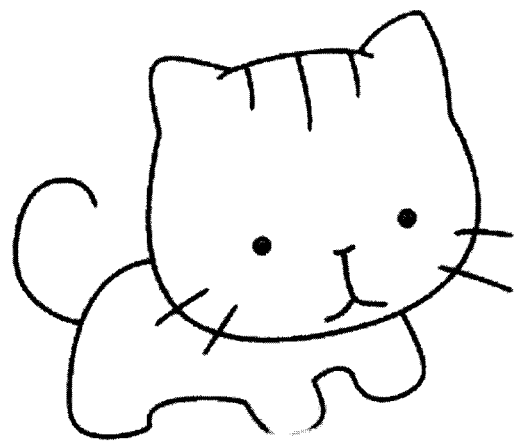
FIG. 3 shows an example of an original image to be used by embodiments of the present disclosure.

FIG. 2 shows one example of a flowchart indicating process steps in accordance with embodiments of the present disclosure. At block 201, an original image is obtained by an electronic device operatively coupled to a processing unit. FIG. 3 shows an example of an original image to be used by embodiments of the present disclosure. The original image can be selected randomly from a database which is triggered by a request from a user to access a resource (a webpage for example). In accordance with embodiments of the present disclosure, there is no need to make any distortion of the original image; therefore, the user can easily identify the image without the complex process of "guessing" the image. The original image can be either a black and white image or a colorized image which is not limited in the context. Although FIG. 3 uses a picture of a cat as an example, it will be appreciated that there is no limitation to the content of the original image. It can be an image of a picture, text, or character, etc.

Figure 4:
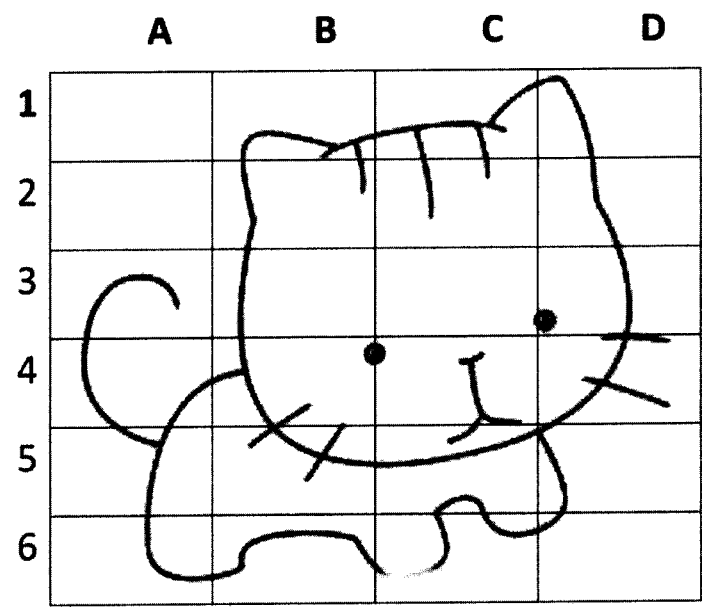
FIG. 4 shows an example diagram to segment the original image in accordance with embodiments of the present disclosure.

Returning to FIG. 2, at block 203, the original image is segmented by the electronic device into a plurality of parts (e.g., M parts). FIG. 4 shows a diagram to segment the original image in accordance with embodiments of the present disclosure. According to the embodiment in FIG. 4, the original image is segmented into 24 parts. The process of which includes, for instance: segmenting the original image into 6 parts horizontally to generate rows 1-6, and segmenting the original image into 4 parts vertically to generate columns A-D, so that 24 parts of the original image are obtained, each of which is just a small piece of the original image and together they compose the whole image.

Persistence of vision refers to the optical illusion that occurs when visual perception of an object does not cease for some time after the rays of light proceeding from it have ceased to enter the eye. Whenever light strikes the retina, the brain retains the impression of that light for a short period (depending on the brightness of the image, retinal field of view, and color) after the source of that light is removed from sight. This is due to a prolonged chemical reaction. As a result, the eye cannot clearly distinguish changes in light that occur faster than this retention period. The changes either go unnoticed or they appear to be one continuous picture to the human observer. For example, when a movie is watched, it feels like a continuous experience even though the screen is dark about half the time. Films show one new frame every $\frac{1}{24}$ of a second. Depending on the film, each frame is shown twice or three times during this period. The eye retains the image of each frame long enough to give a human the illusion of smooth motion. Embodiments of this invention take advantage of human persistence of vision in generating a CAPTCHA.

Figure 5:
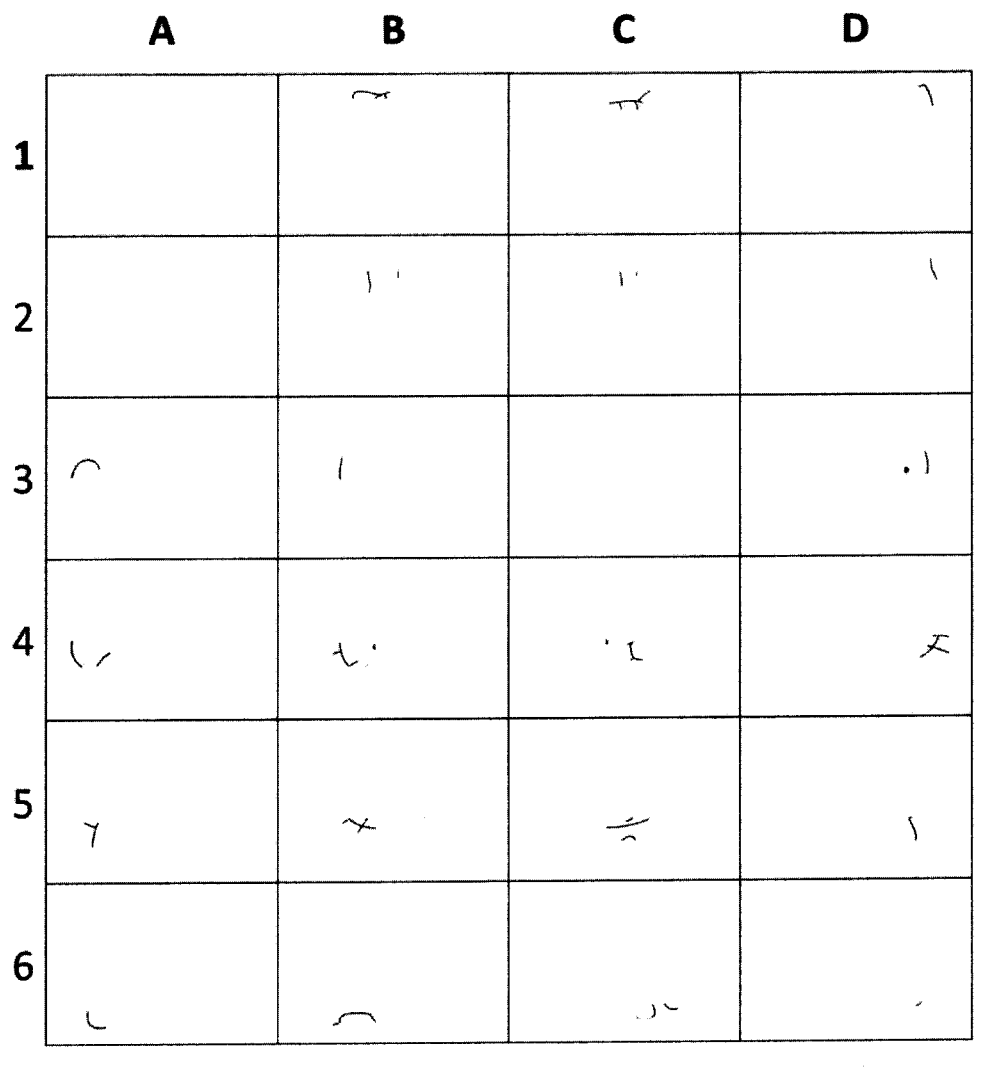

Consequently, according to embodiments of FIG. 4, the original image is segmented into 24 parts which could be enough for users to keep persistence of vision. FIG. 5 shows a diagram of M figures segmented from the original image in accordance with embodiments of the present disclosure. FIG. 5 contains 24 figures, each corresponding to a part in FIG. 4. For example, figure B1 (Column B, Row 1) in FIG. 5 represents part B1 (Column B, Row 1) of FIG. 4 in the whole original image; figure B2 (Column B, Row 2) in FIG. 5 represents part B2 (Column B, Row 2) of FIG. 4 in the whole original image. As FIG. 5 contains 24 figures, each represents a part in FIG. 4, and a combination of those 24 figures restores the original image shown in FIG. 3 and FIG. 4.

According to embodiments of the present disclosure in FIG. 4, it is not necessary to require each part to contain a substantial piece of the original image. For example, A1 (Column A, Row 1) and A2 (Column A, Row 2) parts in FIG. 4 are blank without containing any substantial part of the original image. Generally, this depends on the detail technique to perform segmentation.

It should be appreciated that FIG. 4 provides only an illustration of an implementation and does not imply any limitation with regard to the technique of segmentation in which different embodiments can be implemented, like randomly segmenting the original image into 24 parts, each of which may be presented in a different size, different shapes, even in irregular shapes.

Returning to FIG. 2, at block 205, a group of figures may be determined, by the electronic device, based on the M parts to enable the group of figures to be displayed at a certain rate for a user to recognize the original image.

According to some embodiments, each figure of the group of figures could be originated from one part of the M parts, like what has been shown in FIG. 5. For example, each picture in FIG. 5 is shaped from a part in FIG. 4 to represent that part and its position in the whole image.

Figure 6A:
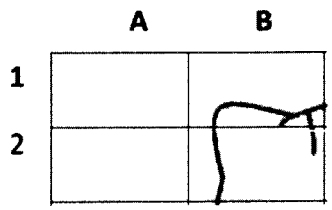
FIGS. 6A-6C shows examples of combinations of multiple parts in accordance with embodiments of the present disclosure.
Figure 6B:
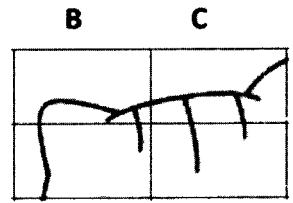
Figure 6C:
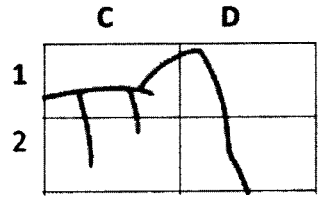

In accordance with embodiments of the disclosure, at least two parts in the M parts can be combined together to shape a figure, and/or at least one of the M parts is included in at least two figures of the group, so that there is a certain level of overlap between the two figures. FIGS. 6A-6C show examples of combinations of multiple parts. FIG. 6A shows a combination of parts A1, A2, B1 and B2 in FIG. 4. FIG. 6B shows a combination of parts B1, B2, C1 and C2 in FIG. 4. FIG. 6C shows a combination of parts C1, C2, D1 and D2 in FIG. 4. It could be seen that FIG. 6A and FIG. 6B overlap on parts B1 and B2; and FIG. 6B and FIG. 6C overlap on parts C1 and C2, as examples. It could be understood that figures determined in block 205 of FIG. 2 could also have a certain level of overlap. Allowing overlap between figures can help to remain or strengthen stability of persistence of vision because a same part will remain in the user's eye for a longer time. Generally, because the visual residuals in a human's eyes can be up to, e.g., 40 ms, if a player shows figures at a rate higher than, e.g., 24 Hz, the user will not feel flickers. But, if the player's refresh frequency is less than, e.g., 24 Hz, the user may feel flickers. In such an example, if a certain level of overlap is determined between different figures, this can help to offset the flickers felt by the user.

It is appreciated that although FIGS. 6A-6C combine adjacent parts into a subgroup, it may also randomly select multiple parts and combine them into a subgroup which can also overlap between figures in the group finally determined and offset the flickers.

Figure 7A:
FIG. 7A shows an example of a disturbance image.
Figure 7B:
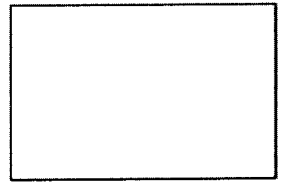
FIG. 7B shows another example of a disturbance image.

FIGS. 7A and 7B show two examples of disturbance figures. To increase the machine's recognition difficulty, in some embodiments, at least one disturbance figure could be inserted into the group of figures. A disturbance figure could be a pure black or a pure white figure as shown in FIG. 7A and FIG. 7B, respectively. Once a disturbance figure is inserted, computers cannot restore the original image even if it captures all slices of the figures. One major difference between a human and a machine is that a human has persistence of vision, but computers do not. So displaying a group of figures at a reasonable frequency (for example, 24 HZ) will impress the human with a clear and full image. As long as the number of disturbance figures is not much (one or two, for example), the human can ignore them easily and still recognize the whole image without being disturbed by the disturbance figures. A disturbance figure, however, once obtained by a computer, will be merged together with the other figures in the group making the merged figures impossible to be recognized.

The term inserting recited herein should not be limited to an action of inserting a disturbance figure in the middle of other figures in the group; it can also be used to describe inserting a figure at the very beginning or at the end of the group. If multiple disturbance figures are used, they could be inserted consecutively or separately. According to the example in FIG. 5, once the disturbance figure is inserted, the number of the figures in the group might be larger than 24.

The disturbance figure can be generated randomly, so that it would be harder for a computer to analyze which figure is the disturbance figure in the group. Further, FIG. 7A and FIG. 7B are just provided for reference without any limitation regarding to the detail design (including color, layout, etc.) of a disturbance figure, which could actually be any picture so long as it can be used to disturb judgement of a computer to recognize the original images.

In some embodiments, each one of the M parts is included in at least one figure of the group, which means all M parts are finally used in the group of figures. Therefore, a complete original image can be visible to the users. Generally, this may provide a good user experience, as the user can see an undistorted and complete image. In some other embodiments, an incomplete image can be visible to users. For example, one part of the 24 parts can be intentionally missed, so that the group of figures includes only 23 parts, which can increase the difficulty to recognize an image by a computer. In some other embodiments, a distorted image can be visible to the users. For example, at least one part of the parts is further distorted before it is included in the group of figures. This may also increase difficulty to recognize an image.

Figure 8:
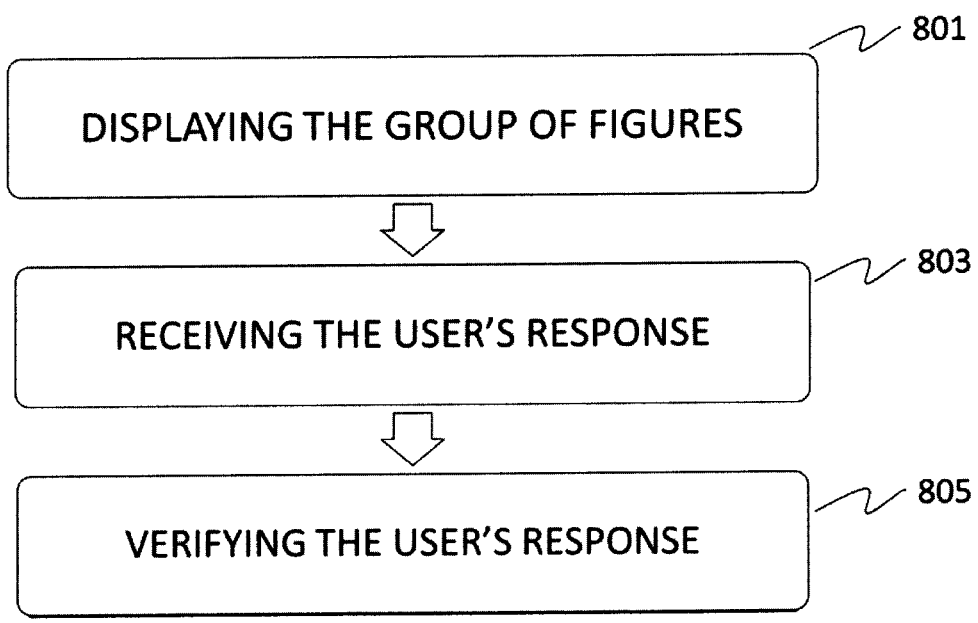
FIG. 8 shows an example flowchart of a method for verifying a user's response in accordance with embodiments of the present disclosure.

FIG. 8 shows one example of a flowchart of a technique for verifying a user's response in accordance with embodiments of the present disclosure. The group of figures determined according to block 205 in FIG. 2 can be used to verify a user's response. At block 801, the group of figures can be displayed, e.g., one by one, to the user at a certain rate; for example, higher than 24 Hz. The group of figures can be displayed via a web browser or any other HTML players. Because the visual residuals in a human's eyes can be up to 40 ms, if the player displays the group of figures at a rate higher than, e.g., 24 Hz, a user will not feel flickers.

At block 803, the user's response regarding the group of figures is received. For example, the user may be asked to identify the original image from a series of given images, or the user may be asked to identify a word describing the original image visible to the user (like select "cat" from a number of other words given as options), or the user may be required to input a word describing the image which is visible to the user (still taking figures in FIG. 4 as an example, the user may input "cat", "kitten" in a text box). It would also be appreciated that above illustrations are just provided as examples, without suggesting any limitations as to the scope of aspects of the invention.

At block 805, the user's response is verified to determine whether the original image is recognized or not. For example, verifying whether the user selects a correct image from multiple options, whether the user selects a correct word describing the image the user saw, whether the user uses a correct (or basically correct) word to describe the image the user saw, etc. It would also be appreciated that the above illustrations are just provided as examples, without suggesting any limitations as to the scope of aspects of the invention.

In one example, if the user's response is successfully verified (i.e., the user recognizes the original image), then the user is permitted to access a requested resource (e.g., website). For instance, based on a successful verification, the user may begin or continue to use online resources to search, shop, pay, etc. However, if the verification fails, then the user is prevented from access or further access to the resource.

According to embodiments of this disclosure, to enhance security of this technique, the original image and M parts of the original image are stored at the server side only, and only the group of figures determined could be sent to the client side for verifying the user's response. Other variations are possible.

Reference throughout this specification to "one embodiment," "an embodiment," "some embodiments," or similar language means that a particular feature, structure, or characteristic described in connection with the embodiment is included in at least one embodiment of the present disclosure. Thus, appearances of the phrases "in one embodiment," "in an embodiment," "in some embodiments", and similar language throughout this specification may, but do not necessarily, all refer to the same embodiment.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising," or "includes" and/or "including," or "has" and/or "having," when used in this specification, specify the presence of stated features, regions, integers, steps, operations, elements, and/or components, but do not preclude the presence or addition of one or more other features, regions, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system, comprising:
   a memory; and
   a processor in communication with the memory, wherein the computer system is configured to perform a method, said method comprising:
   providing a visual test to regulate access to a computer resource in response to a request by a user to access the computer resource, the visual test exploiting visual retention of the user within a period of time, the providing comprising:
   obtaining an image;
   segmenting the image into a plurality of parts and generating a plurality of figures using the plurality of parts of the image, each figure of the plurality of figures comprising at least one respective part of the plurality of parts of the image, wherein a portion of at least one figure of the plurality of figures overlaps with a portion of another figure of the plurality of figures;
   compiling the plurality of figures as a group of figures to be displayed in a sequence of figures;
   combining at least two figures of the plurality of the figures into a subgroup of the group of figures, the subgroup comprising adjacent parts of the plurality of parts of the image, wherein the subgroup comprises the one figure of the plurality of figures with the portion also repeated within the another figure of the plurality of figures and the another figure of the plurality of figures; and
   displaying, in the sequence, the figures of the group of figures to the user at a certain rate, the certain rate enabling the user to visually recognize the image from the plurality of figures with the plurality of parts of the image based, in part, on the portion of the one figure of the plurality of figures being overlapped with the portion of the another figure of the plurality of figures.

2. The computer system of claim 1, wherein the determining the group of figures further comprises inserting at least one disturbance figure into the group of figures.

3. The computer system of claim 1, wherein the method further comprises:
   receiving a response from the user regarding the group of figures; and
   verifying the response from the user to determine whether the image is recognized.

4. The computer system of claim 1, wherein the plurality of parts comprises parts of varying size and shape.

5. The computer system of claim 1, wherein at least one part of the plurality of parts of the image is blank.

6. The computer system of claim 1, wherein each part of the plurality of parts is included in at least one figure of the plurality of figures.

7. The computer system of claim 1, wherein at least one part of the plurality of parts is distorted.

8. The computer system of claim 1, further comprising providing the user with access to the computer resource based on verifying a response from the user to the visual test.

9. The computer system of claim 8, wherein the response comprises an identification of the image from a series of images provided to the user.

10. The computer system of claim 8, wherein the response comprises an identification of a word describing the image.

11. A computer program product, comprising:
a non-transitory computer readable storage medium readable by a processing circuit and storing instructions for performing a method comprising:
providing a visual test to regulate access to a computer resource in response to a request by a user to access the computer resource, the visual test exploiting visual retention of the user within a period of time, the providing comprising:
obtaining an image;
segmenting the image into a plurality of parts and generating a plurality of figures using the plurality of parts of the image, each figure of the plurality of figures comprising at least one respective part of the plurality of parts of the image, wherein a portion of at least one figure of the plurality of figures overlaps with a portion of another figure of the plurality of figures;
compiling the plurality of figures as a group of figures to be displayed in a sequence of figures;
combining at least two figures of the plurality of the figures into a subgroup of the group of figures, the subgroup comprising adjacent parts of the plurality of parts of the image, wherein the subgroup comprises the one figure of the plurality of figures with the portion also repeated within the another figure of the plurality of figures and the another figure of the plurality of figures; and
displaying, in the sequence, the figures of the group of figures to the user at a certain rate, the certain rate enabling the user to visually recognize the image from the plurality of figures with the plurality of parts of the image based, in part, on the portion of the one figure of the plurality of figures being overlapped with the portion of the another figure of the plurality of figures.

12. The computer program product of claim 11, wherein the determining the group of figures further comprises inserting at least one disturbance figure into the group of figures.

13. The computer program product of claim 11, wherein the method further comprises:
receiving a response from the user regarding the group of figures; and
verifying the response from the user to determine whether the image is recognized.

\* \* \* \* \*